United States Patent [19]

Robertson

[11] Patent Number: 4,728,170
[45] Date of Patent: Mar. 1, 1988

[54] SINGLE MODE OPTICAL FIBRE ATTENUATORS

[75] Inventor: Alexander J. Robertson, Gu Dunmow, United Kingdom

[73] Assignee: Standard Telephones and Cables Public Limited Co., London, England

[21] Appl. No.: 724,112

[22] Filed: Apr. 17, 1985

[30] Foreign Application Priority Data

May 11, 1984 [GB] United Kingdom ............... 8412034

[51] Int. Cl.⁴ ........................................... G02B 6/26
[52] U.S. Cl. .................................. 350/96.15; 350/96.10
[58] Field of Search ............ 350/96.15, 96.18, 96.20, 350/96.21, 96.29, 96.30

[56] References Cited

U.S. PATENT DOCUMENTS

| 3,579,316 | 11/1968 | Dyott et al. ............... 350/96.15 X |
| 4,124,270 | 11/1978 | Cheo ............................ 350/96.15 X |
| 4,212,514 | 7/1980 | Prunier et al. ............. 350/96.21 |
| 4,291,940 | 9/1981 | Kawasaki et al. .......... 350/96.15 |
| 4,400,056 | 8/1983 | Cielo .......................... 350/96.30 X |
| 4,557,557 | 12/1985 | Gleason et al. ............ 350/96.20 X |
| 4,601,541 | 7/1986 | Shaw et al. ................ 350/96.15 X |
| 4,630,890 | 12/1986 | Ashkin et al. ............. 350/96.30 |

FOREIGN PATENT DOCUMENTS

| 1105752 | 7/1981 | Canada ..................... 350/96.15 |
| 1105304 | 7/1981 | Canada ..................... 350/96.15 |
| 3126217A | 7/1981 | Fed. Rep. of Germany . |
| 2422971A | 4/1978 | France . |
| 55-79402 | 6/1980 | Japan . |
| 56-30104 | 3/1981 | Japan . |
| 2128766 | 5/1984 | United Kingdom ....... 350/96.15 |

Primary Examiner—William L. Sikes
Assistant Examiner—Akm E. Ullah
Attorney, Agent, or Firm—Kerkam, Stowell, Kondracki & Clarke

[57] ABSTRACT

A single mode optical fibre preset attenuator is made by forming a fusion splice (2) between a length of silica fibre possessing no internal waveguiding structure to a length (1) of single mode optical fibre. Then the silica fibre is cut to a predetermined length to form a short stub (3) which is fusion spliced to a second length (4) of single mode fibre. The fusion splicing equipment may subsequently be used to heat soften the central region of the stub to enable it to be shortened or lengthened to fine tune the attenuation provided.

8 Claims, 5 Drawing Figures

SINGLE MODE OPTICAL FIBRE ATTENUATORS

BACKGROUND OF THE INVENTION

There exists in some single mode optical fibre systems a need for fixed attenuators. One method by which such an attenuator may be produced is described in published UK Specification No. 2128766A, and involves the localised heating of a single mode fibre to promote diffusion across the core/cladding interface in that region to produce a localised weakening of the strength of waveguiding, and hence an increase in attenuation. The amount of attenuation provided by this method depends upon the length of the heated zone, the temperature of heating, and the duration. This value can be increased by further heating, but no method is described by which it can be reduced.

SUMMARY OF THE INVENTION

An object of the present invention is concerned with the provision of a preset type of attenuator. In this context the word preset is used to signify that in an initial stage of manufacture the attenuator is constructed to provide an attenuation value defined within relatively coarse limits, and that after this the attenuator is capable, in a subsequent fine tuning stage of manufacture, of having its attenuation value adjusted, upwards or downwards, to bring it within finer limits, but that no means are provided for subsequent adjustment of this value during the course of operational use of the attenuator.

According to the present invention there is provided a method of making a single mode optical fibre preset attenuator characterised in that the two ends of a stub length of glass fibre possessing no internal waveguiding structure are fusion spliced to the ends of two lengths of single mode glass optical fibre.

BRIEF DESCRIPTION OF THE DRAWINGS

There follows a description of the manufacture of a single mode optical fibre preset attenuator embodying the invention in a preferred form. The description refers to the accompanying drawings in which.

DETAILED DESCRIPTION OF THE PREFERRED EMBODIMENT

Figure 1:
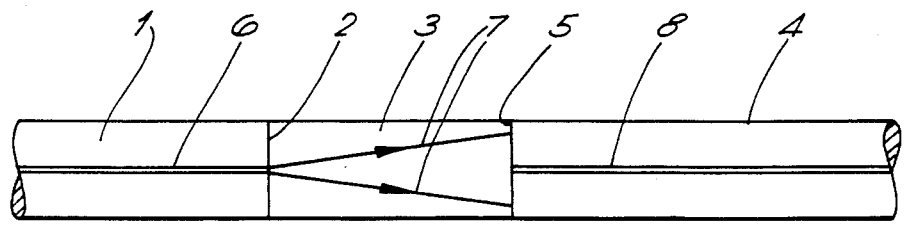
FIG. 1 depicts an attenuator after the initial stage of manufacture and before adjustment.

A length 1 of single mode glass optical fibre, is cleaved in conventional manner preparatory for fusion splicing. Similarly a length of glass fibre possessing no internal waveguiding structure is also cleaved to prepare it for fusion splicing. The two fibres are then electric arc fusion spliced in conventional manner to form the fusion splice 2. Next the glass fibre possessing no internal waveguiding structure is cleaved for a second time to leave a short stub 3 of the fibre attached to fibre 1.

Typically the length of this stub is between 0.1 and 1.5 mm long according to the amount of attenuation required.

Then a second length 4 of single mode glass optical fibre is cleaved before being fusion spliced to the stub 3 so as to form the fusion splice 5.

Figure 2:
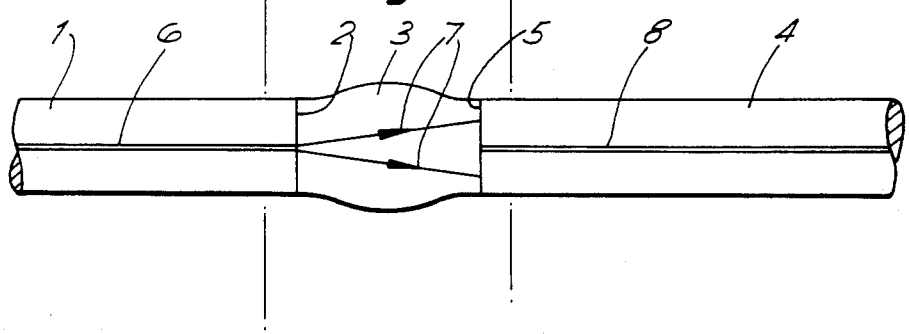
FIGS. 2 and 3 depict attenuators respectively after adjustment to reduce the attenuation, and after adjustment to increase the attenuation.
Figure 3:
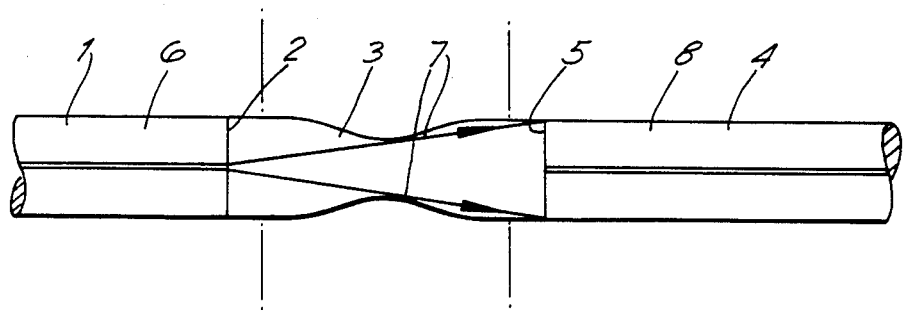

Core mode light that is launched into the core 6 of fibre 1 in a direction to propagate towards fusion splice 2 spreads out in a cone 7 upon entering the stub 3 so that not all of it is launched as core mode light into the core 8 of the second fibre 4. The amount that is 'lost' (i.e. is radiated or is launched in cladding modes) depends upon the length of the stub. If the length of the stub is found not to provide the precise value of attenuation required, this value can be altered by using the splicing equipment to heat-soften an intermediate portion of its length, and then either advancing the spliced ends of fibres 1 and 4 axially inwardly towards each other, or retracting them axially away from each other according to whether it is desired to reduce the attenuation value (FIG. 2) or to increase the attenuation (FIG. 3).

Figure 4:
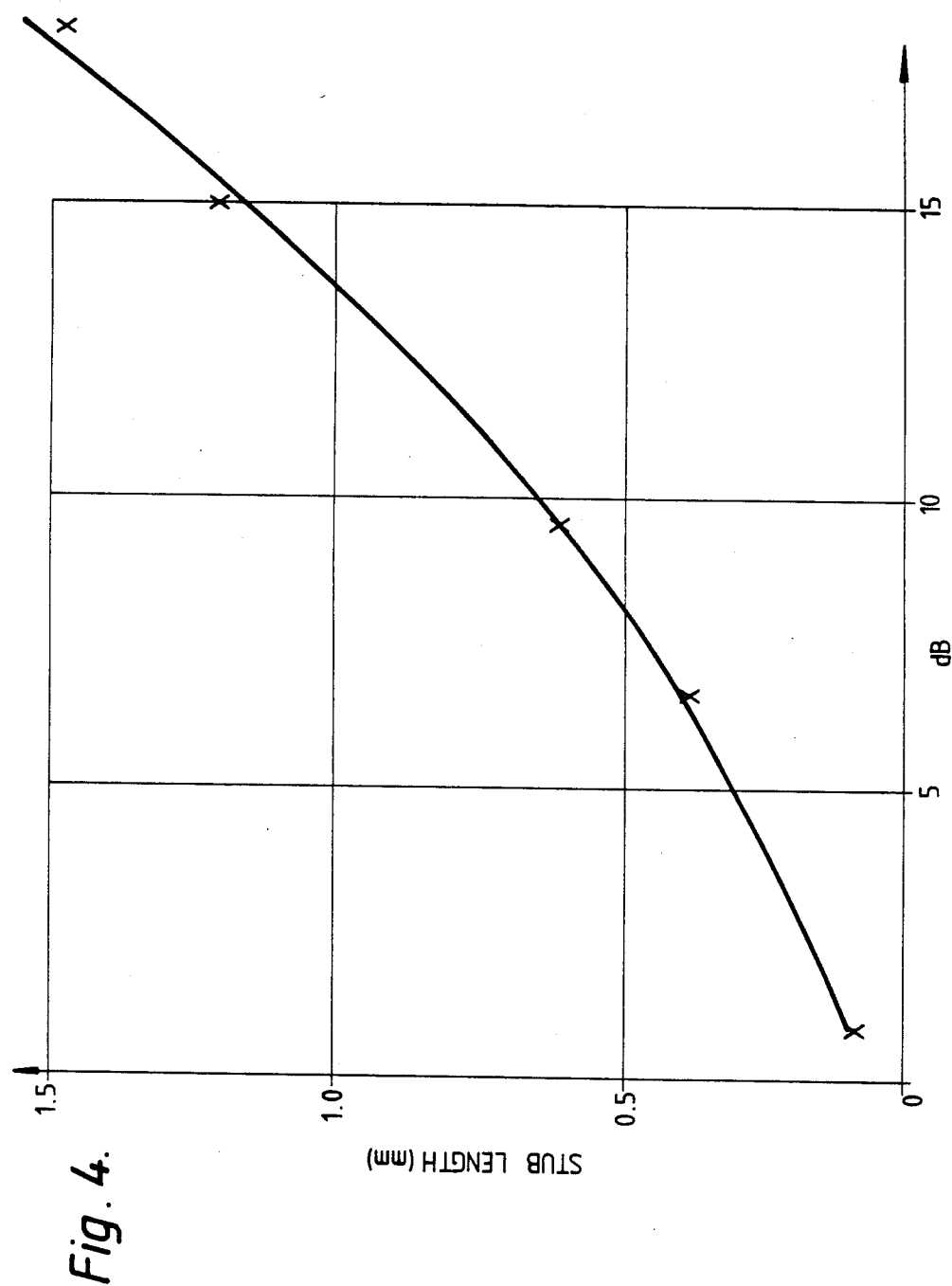
FIG. 4 is a graph showing the relationship between stub length and attenuation.

FIG. 4 is a graph showing some measured values of attenuation plotted as a function of stub length for some single mode vapour deposited silica fibre having an outside diameter of 125 microns and a step index equivalent core diameter of 9 microns based on a refractive index step of 0.0033. For the purposes of comparison these plots are set against a curve depicting the theoretical attenuation based on the step index equivalent fibre. By way of example one attenuator was initially made with a stub length providing a measured attenuation value of 17.1 dB. This attenuator was replaced in the fusion splicing equipment and, while the central region of the stub was maintained by the arc in a heat softened condition, the ends of the two fibres were advanced towards each other by about 0.20 mm to reduce the attenuation to a measured value of 15.4 dB.

Figure 5:
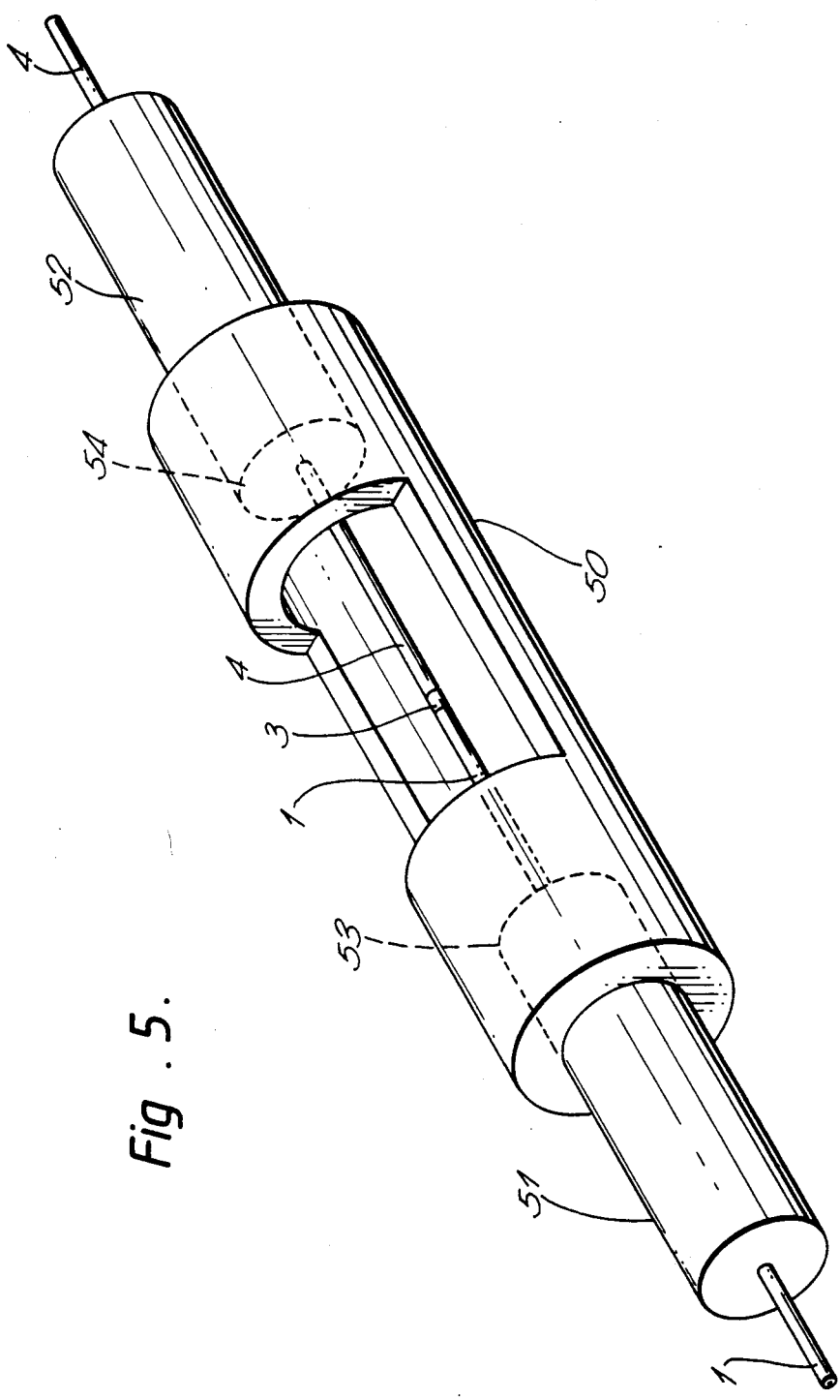
FIG. 5 depicts a schematic perspective view of the completed attenuator mounted in a protective housing.

The value of attenuation provided by this attenuator is liable to be changed if a bend is put into the system in the region of the splices, and hence it is generally desirable to house this region in some form of structure providing restraint against bending. Since the fusion splices are liable to provide a localised region of mechanical weakness, the employment of such a structure may also be useful in providing additional protection against the effects of tensile stress. One form that this support structure can take is depicted in FIG. 5 and consists of a stainless steel tube 50 whose bore is large enough to accept the plastics protective coatings 51 and 52 that envelop the fibres 1 and 4 except in the regions from which they have been removed in order to effect fusion splicing to the stub 3. The length of the tube 50, typically about 3 cm long, is chosen so that the ends 53, 54 of the plastics coatings enter the ends of the tube 50. The interior is filled with adhesive (not shown), typically epoxy resin, to secure the assembly. In order to facilitate the filling of the tube a portion of its wall is removed from a central section of the tube so that the adhesive can be introduced centrally and caused to flow outwardly towards the ends of the tube.

Generally it is desirable to take steps to ensure that any light propagating in cladding modes in either of the fibres 1 and 4 is stripped before there is any risk of it coupling back into core modes to an excessive extent. This means that it will generally be desirable to ensure that cladding modes are stripped from the fibre that is being used to launch light into the stub because the stub is a region of high coupling between the core and cladding modes. Such cladding modes may be present here as a result of their having been injected upstream, for instance at a connector or splice. It also means that it will generally be desirable to ensure that cladding modes are quickly stripped from the fibre into which the light propagating in the stub is launched because the optical power here launched into the cladding modes of this fibre is relatively high.

If the fibres being spliced to the stub 3 already include a cladding modes stripper within their structure no special action will be necessary to achieve the desired stripping. In the absence of such a structure the requisite stripping may be achieved by removing the plastics coatings 51 and 52 from fibres 1 and 4 in regions upstream and downstream of the tube 40 and coating the exposed fibres with an absorbing paint. The stripped regions may each be typically between 5 and 25 cm in length. They are not necessarily of equal length, and in a typical system we have found a higher degree of mode stripping was required on the downstream side than on the upstream side. Mechanical protection for the mode stripping regions is conveniently provided by inserting both of them together with the intervening tube 50 into a U-shaped channel (not shown) which is then filled with a suitable adhesive such as an epoxy resin.

I claim:

1. A single mode optical fibre preset attenuator which includes, fusion spliced between an end of a first length of single mode glass optical fibre and an end of a second length of single mode glass optical fibre, a stub length of glass fibre that possesses no internal waveguiding structure.

2. An attenuator as claimed in claim 1, wherein the stub length of glass fibre, and the end of each length of single mode fibre to which the stub length is spliced, are secured in a protective housing.

3. An attenuator as claimed in claim 1, wherein each of said first and said second lengths of single mode fibre includes a cladding modes stripper within its structure.

4. An attenuator as claimed in claim 1, wherein each of said first and said second lengths of single mode fibre is provided with a localised cladding modes stripper in a zone adjacent said stub length of fibre.

5. A method of making a single mode optical fibre preset attenuator that includes first and second lengths of single mode glass optical fibre and a stub length of glass fibre that possesses no internal waveguiding structure, which stub length optically couples one end of said first length of optical fibre with one end of said second length, which method includes the step of using fusion splicing equipment to form a first fusion splice between said one end of said first length of single mode fibre and one end of a glass fibre that possess no internal waveguiding structure, the step of parting the fibre that possesses no internal waveguiding structure, the step of parting the fibre that possesses no internal waveguiding structure at a point that leaves a stub length of that fibre spliced to said first length of single mode fibre, and the step of using the fusion splicing equipment to form a second fusion splice between said one end of the second length of single mode fibre and the end of the stub length of fibre opposite the end previously spliced to said first length of single mode fibre.

6. A method as claimed in claim 5, wherein, after said first and said second fusion splices have been made, the fusion splicing equipment is used to heat-soften a portion of the stub length of fibre intermediate the ends of said stub length, and wherein, while the heat-softened state is maintained, one of said first and said second lengths of single mode fibre is moved axially with respect to the other so as to alter the separation of the ends of the stub length of fibre and thereby produce a fine tuning of the value of the attenuation provided by the attenuator.

7. A method as claimed in claim 6, wherein after the two fusion splices have been made, and after said adjustment has been made to the separation of the ends of the stub length of fibre, the two splices are secured in a protective housing.

8. A method as claimed in claim 6, wherein after the two fusion splices have been made, and after said adjustment has been made to the separation of the ends of the stub length of fibre, the two splices are secured by means of adhesive in a housing of generally tubular shape.

* * * * *